United States Patent
Rathi et al.

(10) Patent No.: US 11,572,015 B2
(45) Date of Patent: Feb. 7, 2023

(54) MULTI-CAMERA VEHICULAR VISION SYSTEM WITH GRAPHIC OVERLAY

(71) Applicant: MAGNA ELECTRONICS INC., Auburn Hills, MI (US)

(72) Inventors: Ghanshyam Rathi, Mississauga (CA); Hilda Faraji, Toronto (CA); Nikhil Gupta, Brampton (CA); Christian Traub, Windach (DE); Michael Schaffner, Gross-Gerau (DE); Goerg Pflug, Weil der Stadt (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/457,701

(22) Filed: Dec. 6, 2021

(65) Prior Publication Data
US 2022/0089088 A1    Mar. 24, 2022

Related U.S. Application Data

(63) Continuation of application No. 16/948,474, filed on Sep. 21, 2020, now Pat. No. 11,192,500, which is a
(Continued)

(51) Int. Cl.
*B60R 1/00*    (2022.01)
*H04N 5/225*    (2006.01)
(Continued)

(52) U.S. Cl.
CPC .............. *B60R 1/00* (2013.01); *G06T 3/4038* (2013.01); *G06V 20/56* (2022.01); *G06V 20/58* (2022.01);
(Continued)

(58) Field of Classification Search
CPC .. B60R 1/00; G06K 9/00791; G06K 9/00798; G06K 9/00805; G06T 3/4038; H04N 5/2258; H04N 5/23229; H04N 3/4038
See application file for complete search history.

(56) References Cited

U.S. PATENT DOCUMENTS

| 4,961,625 A | 10/1990 | Wood et al. |
| 4,966,441 A | 10/1990 | Conner |

(Continued)

FOREIGN PATENT DOCUMENTS

| EP | 0353200 A2 | 1/1990 |
| EP | 0361914 A2 | 4/1990 |

(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Jae N Noh
(74) *Attorney, Agent, or Firm* — Honigman LLP

(57) ABSTRACT

A vehicular vision system includes a plurality of cameras disposed at a vehicle and capturing image data as the equipped vehicle is driven along a traffic lane of a road. Captured image data is processed to detect a rearward-approaching vehicle and determine a path of travel of the detected rearward-approaching vehicle. Responsive to determining that the path of travel of the detected rearward-approaching vehicle is along a side traffic lane adjacent to the traffic lane along which the equipped vehicle is driven, the vehicular vision system (i) displays at a video display screen video images derived at least from image data captured by the side camera that is at the side portion of the equipped vehicle that is adjacent to the side traffic lane and (ii) overlays a transparent graphic overlay overlaying the
(Continued)

displayed video images that is based on the determined path of travel of the detected rearward-approaching vehicle.

39 Claims, 15 Drawing Sheets

Related U.S. Application Data continuation of application No. 16/693,515, filed on Nov. 25, 2019, now Pat. No. 10,780,827, which is a continuation of application No. 16/246,624, filed on Jan. 14, 2019, now Pat. No. 10,486,596, which is a continuation of application No. 14/191,512, filed on Feb. 27, 2014, now Pat. No. 10,179,543.

(60) Provisional application No. 61/793,592, filed on Mar. 15, 2013, provisional application No. 61/770,051, filed on Feb. 27, 2013.

(51) Int. Cl.
*H04N 5/232* (2006.01)
*G06T 3/40* (2006.01)
*G06V 20/56* (2022.01)
*G06V 20/58* (2022.01)

(52) U.S. Cl.
CPC ......... *G06V 20/588* (2022.01); *H04N 5/2258* (2013.01); *H04N 5/23229* (2013.01); *B60R 2300/105* (2013.01); *B60R 2300/303* (2013.01); *B60R 2300/607* (2013.01)

(56) References Cited

U.S. PATENT DOCUMENTS

| | | |
|---|---|---|
| 4,967,319 A | 10/1990 | Seko |
| 4,970,653 A | 11/1990 | Kenue |
| 5,003,288 A | 3/1991 | Wilhelm |
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,166,681 A | 11/1992 | Bottesch et al. |
| 5,177,606 A | 1/1993 | Koshizawa |
| 5,182,502 A | 1/1993 | Slotkowski et al. |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,648,835 A | 7/1997 | Uzawa |
| 5,661,303 A | 8/1997 | Teder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,175,300 B1 | 1/2001 | Kendrick |
| 6,198,409 B1 | 3/2001 | Schofield et al. |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,498,620 B2 | 12/2002 | Schofield et al. |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,565 B2 | 7/2003 | Heslin et al. |
| 6,593,698 B2 | 7/2003 | Stam et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |

(56) References Cited

U.S. PATENT DOCUMENTS

| | | |
|---|---|---|
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,741,377 B2 | 5/2004 | Miles |
| 6,744,353 B2 | 6/2004 | Sjonell |
| 6,762,867 B2 | 7/2004 | Lippert et al. |
| 6,794,119 B2 | 9/2004 | Miles |
| 6,795,221 B1 | 9/2004 | Urey |
| 6,807,287 B1 | 10/2004 | Hermans |
| 6,823,241 B2 | 11/2004 | Shirato et al. |
| 6,824,281 B2 | 11/2004 | Schofield et al. |
| 6,864,930 B2 | 3/2005 | Matsushita et al. |
| 6,889,161 B2 | 5/2005 | Winner et al. |
| 6,909,753 B2 | 6/2005 | Meehan et al. |
| 6,975,775 B2 | 12/2005 | Rykowski et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,195,381 B2 | 3/2007 | Lynam et al. |
| 7,202,776 B2 | 4/2007 | Breed |
| 7,227,611 B2 | 6/2007 | Hull et al. |
| 7,338,177 B2 | 3/2008 | Lynam |
| 7,375,803 B1 | 5/2008 | Bamji |
| 7,423,821 B2 | 9/2008 | Bechtel et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,619,508 B2 | 11/2009 | Lynam et al. |
| 7,720,580 B2 | 5/2010 | Higgins-Luthman |
| 7,786,898 B2 | 8/2010 | Stein et al. |
| 7,843,451 B2 | 11/2010 | Lafon |
| 7,855,778 B2 | 12/2010 | Yung et al. |
| 7,881,496 B2 | 2/2011 | Camilleri et al. |
| 7,914,187 B2 | 3/2011 | Higgins-Luthman et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,553,088 B2 | 10/2013 | Stein et al. |
| 10,179,543 B2 | 1/2019 | Rathi et al. |
| 10,486,596 B2 | 11/2019 | Rathi et al. |
| 10,780,827 B2 | 9/2020 | Rathi et al. |
| 11,192,500 B2 | 12/2021 | Rathi et al. |
| 2002/0005778 A1 | 1/2002 | Breed et al. |
| 2002/0011611 A1 | 1/2002 | Huang et al. |
| 2002/0113873 A1 | 8/2002 | Williams |
| 2003/0103142 A1 | 6/2003 | Hitomi et al. |
| 2003/0137586 A1 | 7/2003 | Lewellen |
| 2003/0169413 A1 | 9/2003 | Stanek |
| 2003/0222982 A1 | 12/2003 | Hamdan et al. |
| 2004/0164228 A1 | 8/2004 | Fogg et al. |
| 2005/0053274 A1 | 3/2005 | Mayer et al. |
| 2005/0219852 A1 | 10/2005 | Stam et al. |
| 2005/0237385 A1 | 10/2005 | Kosaka et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0115181 A1 | 6/2006 | Deng et al. |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0180527 A1 | 7/2008 | Nixdorf et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0122136 A1 | 5/2009 | Shiraishi et al. |
| 2009/0160987 A1 | 6/2009 | Bechtel et al. |
| 2009/0190015 A1 | 7/2009 | Bechtel et al. |
| 2009/0201361 A1 | 8/2009 | Lyon et al. |
| 2009/0256938 A1 | 10/2009 | Bechtel et al. |
| 2009/0290032 A1 | 11/2009 | Zhang et al. |
| 2010/0256909 A1 | 10/2010 | Duggan et al. |
| 2011/0058749 A1 | 3/2011 | Cooper |
| 2011/0181728 A1 | 7/2011 | Tieman et al. |
| 2011/0216201 A1 | 9/2011 | McAndrew et al. |
| 2012/0013742 A1 | 1/2012 | Fairchild et al. |
| 2012/0045112 A1 | 2/2012 | Lundblad et al. |
| 2012/0069185 A1 | 3/2012 | Stein |
| 2012/0154591 A1 | 6/2012 | Baur et al. |
| 2012/0200707 A1 | 8/2012 | Stein et al. |
| 2012/0314071 A1 | 12/2012 | Rosenbaum et al. |
| 2012/0320209 A1 | 12/2012 | Vico et al. |
| 2013/0027555 A1 | 1/2013 | Meadow |
| 2013/0107048 A1 | 5/2013 | Rottner et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2013/0342333 A1 | 12/2013 | Hutchings |
| 2014/0043473 A1 | 2/2014 | Gupta et al. |
| 2014/0063254 A1 | 3/2014 | Shi et al. |
| 2014/0098229 A1 | 4/2014 | Lu et al. |
| 2014/0139669 A1 | 5/2014 | Petrillo et al. |
| 2014/0247352 A1 | 9/2014 | Rathi et al. |
| 2014/0247354 A1 | 9/2014 | Knudsen |
| 2014/0285666 A1 | 9/2014 | O'Connell et al. |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2015/0036885 A1 | 2/2015 | Pflug et al. |
| 2015/0042799 A1* | 2/2015 | Zhang .................... G06V 20/58 348/148 |
| 2015/0097953 A1 | 4/2015 | Stambaugh |
| 2018/0134217 A1 | 5/2018 | Peterson et al. |

FOREIGN PATENT DOCUMENTS

| | | |
|---|---|---|
| EP | 0640903 A1 | 3/1995 |
| EP | 0697641 A2 | 2/1996 |
| EP | 1115250 A1 | 7/2001 |
| EP | 2377094 A1 | 10/2011 |
| EP | 2667325 A1 | 11/2013 |
| GB | 2233530 A | 1/1991 |
| JP | S5539843 A | 3/1980 |
| JP | S58110334 A | 6/1983 |
| JP | S6216073 | 4/1987 |
| JP | 6272245 | 5/1987 |
| JP | S62131837 A | 6/1987 |
| JP | 01123587 | 5/1989 |
| JP | H1168538 A | 7/1989 |
| JP | H236417 | 8/1990 |
| JP | 3099952 | 4/1991 |
| JP | H06227318 A | 8/1994 |
| JP | 07105496 | 4/1995 |
| JP | 2630604 | 7/1997 |
| JP | 200274339 A | 3/2002 |
| JP | 20041658 A | 1/2004 |
| WO | 1994019212 A2 | 9/1994 |
| WO | 1996038319 A2 | 12/1996 |

(56) References Cited

FOREIGN PATENT DOCUMENTS

| WO | 2012139636 A1 | 10/2012 |
|---|---|---|
| WO | 2012139660 A1 | 10/2012 |
| WO | 2012143036 A1 | 10/2012 |

OTHER PUBLICATIONS

Behringer et al., "Simultaneous Estimation of Pitch Angle and Lane Width from the Video Image of a Marked Road," pp. 966-973, Sept. 12-16, 1994.
Borenstein et al., "Where am I? Sensors and Method for Mobile Robot Positioning", University of Michigan, Apr. 1996, pp. 2, 125-128.
Bow, Sing T., "Pattern Recognition and Image Preprocessing (Signal Processing and Communications)", CRC Press, Jan. 15, 2002, pp. 557-559.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 2004.
Franke et al., "Autonomous driving approaches downtown", Intelligent Systems and Their Applications, IEEE 13 (6), 40-48, Nov./Dec. 1999.
Kastrinaki et al., "A survey of video processing techniques for traffic applications".
Philomin et al., "Pedestrain Tracking from a Moving Vehicle".
Sahli et al., "A Kalman Filter-Based Update Scheme for Road Following," IAPR Workshop on Machine Vision Applications, pp. 5-9, Nov. 12-14, 1996.
Sun et al., "On-road vehicle detection using optical sensors: a review", IEEE Conference on Intelligent Transportation Systems, 2004.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Vlacic et al. (Eds), "Intelligent Vehicle Tecnologies, Theory and Applications", Society of Automotive Engineers Inc., edited by SAE International, 2001.
Zheng et al., "An Adaptive System for Traffic Sign Recognition," IEEE Proceedings of the Intelligent Vehicles '94 Symposium, pp. 165-170 (Oct. 1994).

\* cited by examiner

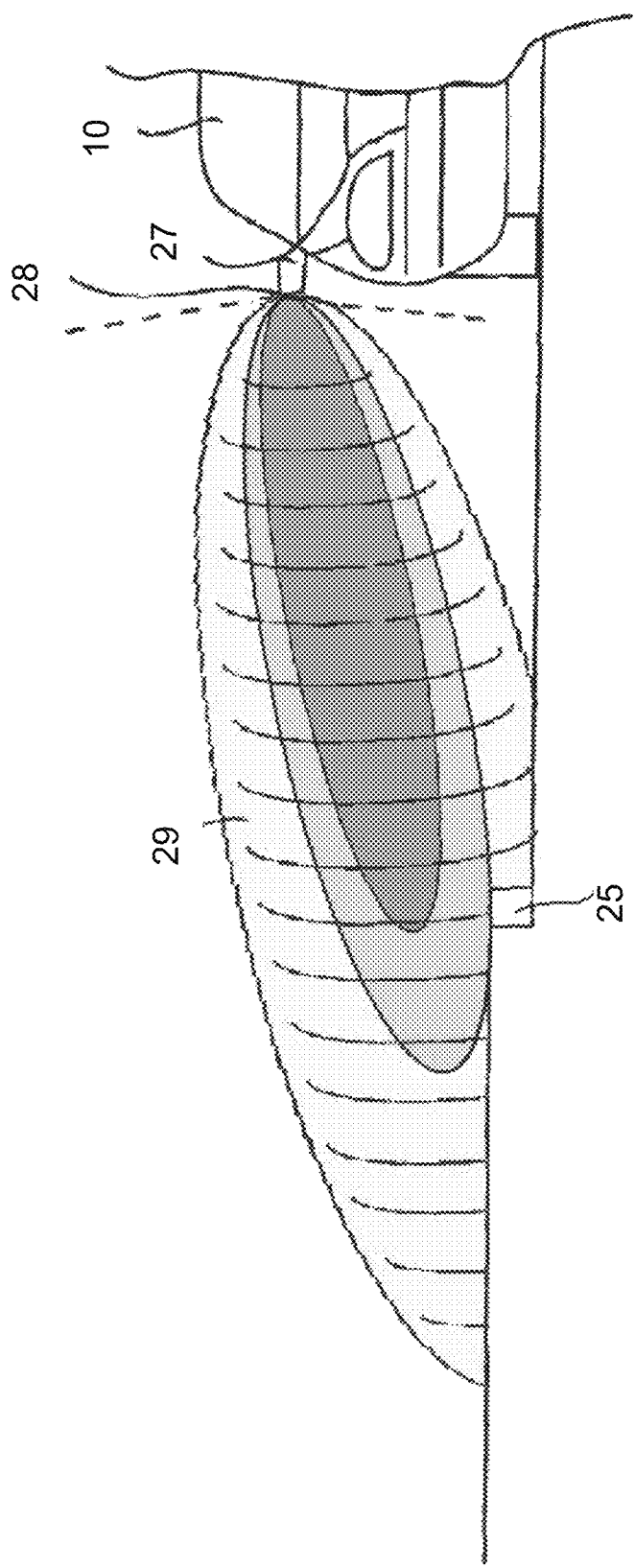

MULTI-CAMERA VEHICULAR VISION SYSTEM WITH GRAPHIC OVERLAY

CROSS REFERENCE TO RELATED APPLICATIONS

The present application is a continuation of U.S. patent application Ser. No. 16/948,474, filed Sep. 21, 2020, now U.S. Pat. No. 11,192,500, which is a continuation of U.S. patent application Ser. No. 16/693,515, filed Nov. 25, 2019, now U.S. Pat. No. 10,780,827, which is a continuation of U.S. patent application Ser. No. 16/246,624, filed Jan. 14, 2019, now U.S. Pat. No. 10,486,596, which is a continuation of U.S. patent application Ser. No. 14/191,512, filed Feb. 27, 2014, now U.S. Pat. No. 10,179,543, which claims the filing benefits of U.S. provisional applications, Ser. No. 61/793,592, filed Mar. 15, 2013, and Ser. No. 61/770,051, filed Feb. 27, 2013, which are hereby incorporated herein by reference in their entireties.

FIELD OF THE INVENTION

The present invention relates generally to vision systems for vehicles and, more particularly, to vision systems having a plurality of exteriorly facing cameras disposed at a vehicle.

BACKGROUND OF THE INVENTION

Rear backup cameras and other exterior vision systems are known for use in vehicles. Examples of such systems are described in U.S. Pat. Nos. 7,859,565; 6,611,202; 6,222,447; 5,949,331; 5,670,935 and/or 5,550,677, which are hereby incorporated herein by reference in their entireties. Such systems may display images for viewing by the driver of the vehicle that provide a view exterior of the vehicle. It is known to provide a plurality of cameras at a vehicle, such as a forward facing camera, a rearward facing camera and opposite sideward facing cameras, and to stitch together images captured by the cameras to provide a surround view or top down view for displaying for viewing by a driver of the vehicle.

SUMMARY OF THE INVENTION

The present invention provides a means for dynamically calibrating or adjusting the image stitching of the images captured by two or more cameras of a multi-camera vision system of a vehicle, such as when the load or level of the vehicle changes.

The present invention provides a dynamic image stitching system or process that monitors overlapping regions of fields of view of adjacent cameras (such as a side camera and a front or rear camera) and adjusts the image stitching of the captured images to adapt the image stitching when the load of the vehicle changes or when the road level or terrain changes or the like. A display screen displays the stitched substantially seamless images for viewing by a driver of the vehicle when the driver is normally operating the vehicle.

Optionally, the dynamic image stitching system of the present invention may include an image processor that is operable to adjust a stitching algorithm responsive to a determination of a change in at least one characteristic of a feature or object present in an overlapping region of the fields of view of two cameras at the vehicle (such as a side camera and a rear camera or such as a side camera and a front camera or the like). For example, the processor may determine a feature or object present in the overlapping region of the cameras' fields of view, and the processor may compare a characteristic of the feature or object in image data captured by a first camera with the corresponding characteristic of the feature or object in image data captured by a second camera. The processor adjusts the stitching algorithm responsive to a determination of a difference between a characteristic of a feature or object in image data captured by the first camera and the characteristic of the feature or object in image data captured by the second camera. For example, the processor may process captured image data to determine whether the feature as captured by the first camera is misaligned with the feature as captured by the second camera, and the processor may adjust the stitching algorithm responsive to such a determination.

These and other objects, advantages, purposes and features of the present invention will become apparent upon review of the following specification in conjunction with the drawings.

BRIEF DESCRIPTION OF THE DRAWINGS

FIG. 7A is a schematic showing a vehicle with an ultrasound distance measuring system having an ultrasound sensor integrated into a side mirror housing of the vehicle in accordance with the present invention, shown with the vehicle in a horizontal level;

DESCRIPTION OF THE PREFERRED EMBODIMENTS

Figure 1:
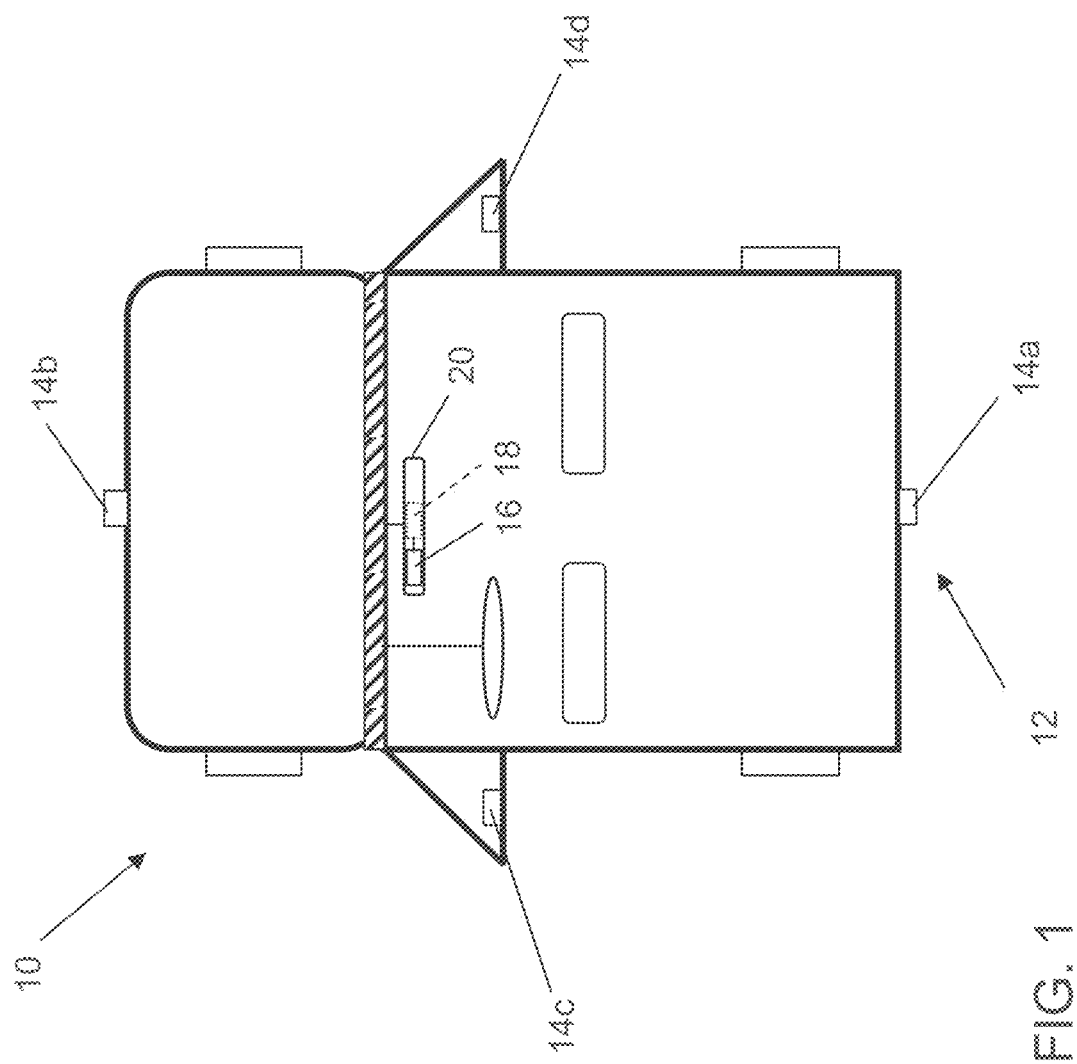
FIG. 1 is a plan view of a vehicle equipped with a multi-camera vision system in accordance with the present invention.
Figure 2:
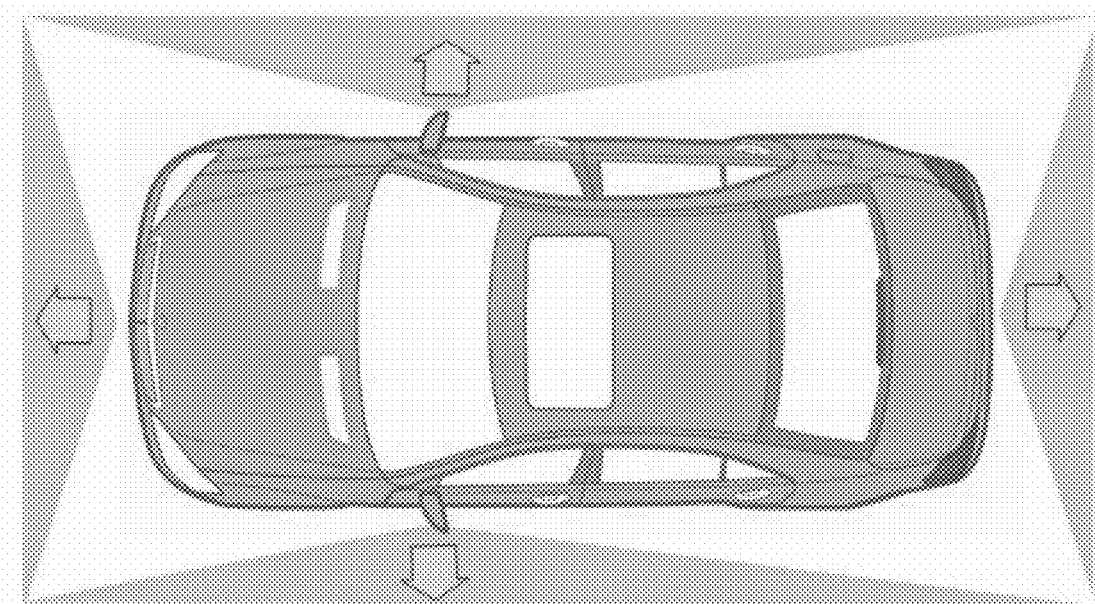
FIG. 2 is a top down view of a vehicle, with arrows indicating the general fields of view of the cameras at the vehicle.
Figure 3:
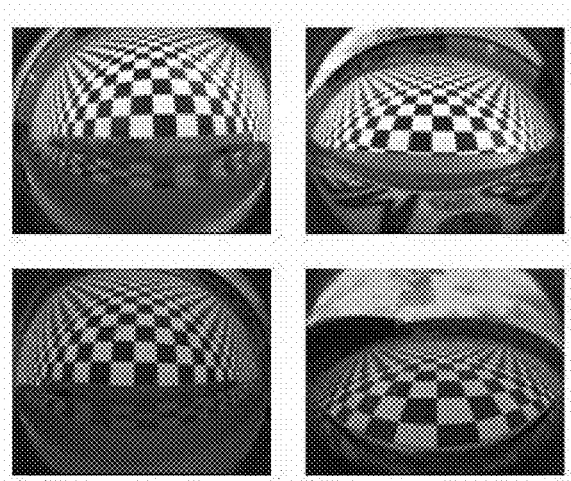
FIG. 3 shows the images captured by the cameras of the vehicle of FIG. 2.
Figure 4:
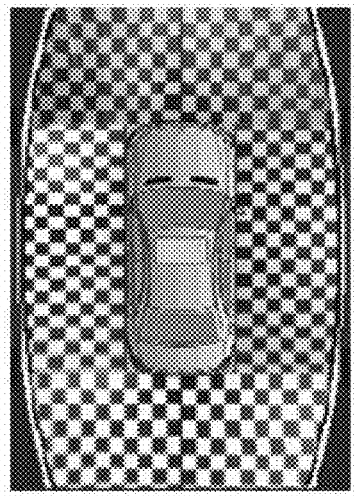
FIG. 4 is a plan view of a vehicle disposed at a calibration pattern.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle).

The dynamic top view vision system of the present invention stitches captured images to form a composite substantially seamless image, and may utilize aspects of the vision systems described in U.S. Pat. Nos. 6,222,447; 5,949,331; 5,760,962; 5,670,935 and/or 5,550,677, and/or U.S. patent applications, Ser. No. 12/508,840, filed Jul. 24, 2009, which published on Jan. 28, 2010 as U.S. Publication No. US-2010-0020170; Ser. No. 13/848,796, filed Mar. 22, 2013, and published on Oct. 24, 2013 as U.S. Publication No. US-2013-0278769, Ser. No. 13/852,190, filed Mar. 28, 2013, and published on Aug. 29, 2013 as U.S. Publication No. US-2013-0222593, Ser. No. 13/894,870, filed May 15, 2013, now U.S. Pat. No. 10,089,537, and/or Ser. No. 14/046,174, filed Oct. 4, 2013, now U.S. Pat. No. 9,723,272, which are hereby incorporated herein by reference in their entireties.

The panoramic or surround view or top view or bird's eye view vision system of the present invention provides a stitched image that is derived from images or image data captured by a plurality of cameras at the vehicle (such as the forward facing camera, the rearward facing camera, the left side camera and the right side camera). In order to provide a substantially seamless stitched image as displayed on a video display screen viewable by the driver when normally operating the equipped vehicle, respective adjoining image portions of the captured images displayed as a composite image need to be properly aligned, so that, for example, a road marking or parking line or similar feature or characteristic that is at least partially captured by one of the cameras and thus is displayed in its respective image portion, and that is also at least partially captured by a second one of the cameras and thus is displayed in its respective image portion, is properly aligned and displayed on the video screen as it should appear when the cameras are properly calibrated and as it would appear in real life on the ground at or near the vehicle. By means of the present invention, misalignments, discontinuities and improperly joined lines in the stitched composite image that may be caused by the likes of vehicle loading and/or road surface out-of-flatness or the like, can be mitigated and preferably at least substantially eliminated.

Uneven road conditions may make the stitched image look broken and misaligned even with properly calibrated cameras. For example, one or more wheels of the vehicle may be raised higher than the other wheels of the vehicle due to the road camber or tilt. Also, a change in vehicle dynamics that differ from the vehicle dynamics at the time of the initial multi-camera system calibration (when the cameras and vision system were initially calibrated, typically at the automobile manufacturing plant itself) may make the stitched/composite displayed image appear misaligned at the stitching edges/joints. Such a change in vehicle dynamics may be due to uneven or changed load distribution at the vehicle, such as a heavy load added at one side or at the rear of the vehicle or at the top of the vehicle causing the vehicle to tilt towards one side or rearward, or due to uneven passenger loading or the like or uneven vehicle suspension performance or the like. Thus, the present invention provides a dynamic multi-camera top view or bird's eye view or surround view system, which is operable to correct for such run-time/real-time errors or misalignments in the stitched images that would otherwise occur, and is operable to so do on an image-by-image or frame-by-frame basis in real time while the vehicle is being normally operated.

As described in U.S. patent application Ser. No. 13/847,815, filed Mar. 20, 2013, and published on Oct. 31, 2013 as U.S. Publication No. US-2013-0286193, which is hereby incorporated herein by reference in its entirety, a multi camera image processing system may be operable to detect the elevation of objects by its sheering effect when the object is seen in an overlapping region by at least two of the vision system fish eye lens cameras at different angles. The dynamic multi-camera vision system of the present invention also uses the overlapping regions of the fields of view of the respective cameras of the system, such as, for example, the overlapping fields of view of a driver-side camera at an exterior sideview mirror of the vehicle and a front camera (with the overlapping region being, for example, at the front left or driver-side corner of the vehicle). The system is operable to process image data representative of overlapping regions in the adjacent camera fields of view to detect corresponding features. When such corresponding features are detected or determined, the system may match the features.

Figure 5:
FIG. 5 is an image captured by a side camera of a vehicle equipped with the vision system of the present invention.
Figure 6:
FIG. 6 is an image captured by a rear camera of a vehicle equipped with the vision system of the present invention.

For example, and with reference to FIGS. 5 and 6, the right side or passenger side camera captures an image sideward of the vehicle, with the captured image encompassing an area rearward and sideward of the vehicle (FIG. 5), while the rear camera captures an image rearward of the vehicle, with the captured image encompassing an area rearward and sideward of the vehicle (FIG. 6). The system is operable to detect corresponding features in the imaged scene, such as the points shown in FIGS. 5 and 6, and may match the features so that, when the images are stitched, the matched corresponding features are generally or substantially aligned and displayed appropriately.

The system of the present invention is operable to generate affine transforms or other suitable transforms that minimize the error in feature mapping from different views. Such an affine transformation or affine map is a transformation that typically preserves straight lines (such that all points lying on a line initially still lie on a line after transformation) and that typically preserves ratios of distances between points lying on a straight line and that typically preserves sets of parallel lines so that they remain generally parallel after transformation.

The system of the present invention is further operable to apply the transforms to correct the final stitched image. For example, the system may determine when there is a change in the characteristics detected or determined in the overlapping regions of the fields of view and may adapt or adjust the image stitching algorithm or process to accommodate for the detected or determined change. Because the system is a dynamic system, the system is operable to re-generate the transforms for every few frames to correct for dynamic conditions (such as changes in the road conditions or changes in the vehicle loading or the like). The present invention thus is operable to adapt the stitching of the images after the cameras are calibrated to adapt the system and accommodate changes in the vehicle and/or road surface that may otherwise adversely affect the quality or seamlessness of the stitched images. The present invention thus provides a vision system that maintains a substantially seamless stitched image for displaying for view by the driver of the vehicle through various driving and/or loading conditions of the vehicle.

The system thus determines differences in features present in overlapping image data captured by a front (or rear) camera and in overlapping image data captured by a side camera, and may adjust the image stitching algorithm accordingly, such that the displayed stitched image provides an enhanced display (such as by assuring that image data captured by the front camera and image data captured by the side camera appropriately align in the display viewed by the driver of the equipped vehicle so that there is no discontinuity or incongruity in the image being displayed). A feature can be any one of a curb at the side of the road being traveled by the equipped vehicle, a lane boundary marking at the side of the road being traveled by the equipped vehicle, an edge region of the road being traveled by the equipped vehicle, a mailbox being approached and passed by the equipped vehicle, a pole or post or pillar at the side of the road being traveled by the equipped vehicle, and/or the like.

For example, while traveling forward on a road, the equipped vehicle may approach a mailbox located at or near a curb to the left of the equipped vehicle. The vehicle is equipped with a forward facing camera mounted at the front of the vehicle and a side-mounted camera mounted at the left or driver-side exterior rearview mirror of the vehicle. As the mailbox is being approached by the vehicle, it is first viewed/imaged by the front or forward facing camera but is not yet viewed/imaged by the side mounted camera. As the vehicle approaches closer to the mailbox, the mailbox is viewed/imaged by both the forward facing camera and the side-mounted camera, and is located at a region or area where the fields of view of both cameras overlap and encompass the mailbox. In this field of view overlap region, the same object or feature (for example, the mailbox) is commonly viewed by the forward facing camera and the side mounted camera. However, the front camera's view/image of the object or feature will be different from that of the side camera's view/image of the object or feature. In accordance with the present invention, this difference is determined by the image processor and the image stitching algorithm is adjusted according to the determined difference.

For example, if the mailbox is located in the overlap region of two cameras (such as at or near or along a stitching line or region of the captured images), the stitching algorithm is adjusted so that the mailbox images (as captured by, for example, both the front camera and the side camera) generally correspond to one another to provide a generally smooth transition of the mailbox image as the mailbox display image moves or transitions from the front camera image to the overlapping region and to the side camera image. For example, the image stitching algorithm may be adjusted to adjust an orientation of the mailbox so that the generally vertical post or structure of the mailbox in images derived from the image data captured by the front camera is generally aligned with the generally vertical post or structure of the mailbox in images derived from the image data captured by the side camera. The system thus accommodates for misalignment of characteristics of features or objects between the images of the front camera and side camera (or the rear camera and side camera).

Therefore, the present invention provides a dynamic process for automatically stitching images captured by the cameras of a multi-camera vision system of a vehicle, such as for a top-down or bird's eye view display for viewing by the driver of the vehicle. For example, the present invention provides a system that adjusts the stitching of adjacent images captured by the front, rear and driver side and passenger side cameras for a surround view or top-down view vision system of a vehicle.

The present invention utilizes the fact that an object that is located in the overlapping region of the fields of view of two of the cameras of the multi-camera system (such as, for example, a driver-side camera and a rear camera of the vehicle) is commonly imaged by that side camera and that rear camera. However, because of the different and known different placement or positions of the cameras at the equipped vehicle, the object will be viewed differently by the respective first and second camera. Such differences are accommodated for and are factored in via the initial factory calibration so that the system displays the object appropriately and correctly in the stitched composite image. However, if, for example, during dynamic loading of the vehicle, these respective views differ from what should occur in an unloaded or unperturbed ideally calibrated scenario, this determined change or difference can be utilized using image processing/algorithmic techniques to adjust the image stitching to compensate for the dynamic loading of the vehicle in real time. Thus, utilizing the present invention, the stitching of the captured images (to provide or generate the stitched composite image) may be adapted for vehicle load changes and level changes and the like in real time and during normal operation of the vehicle.

Figure 8:
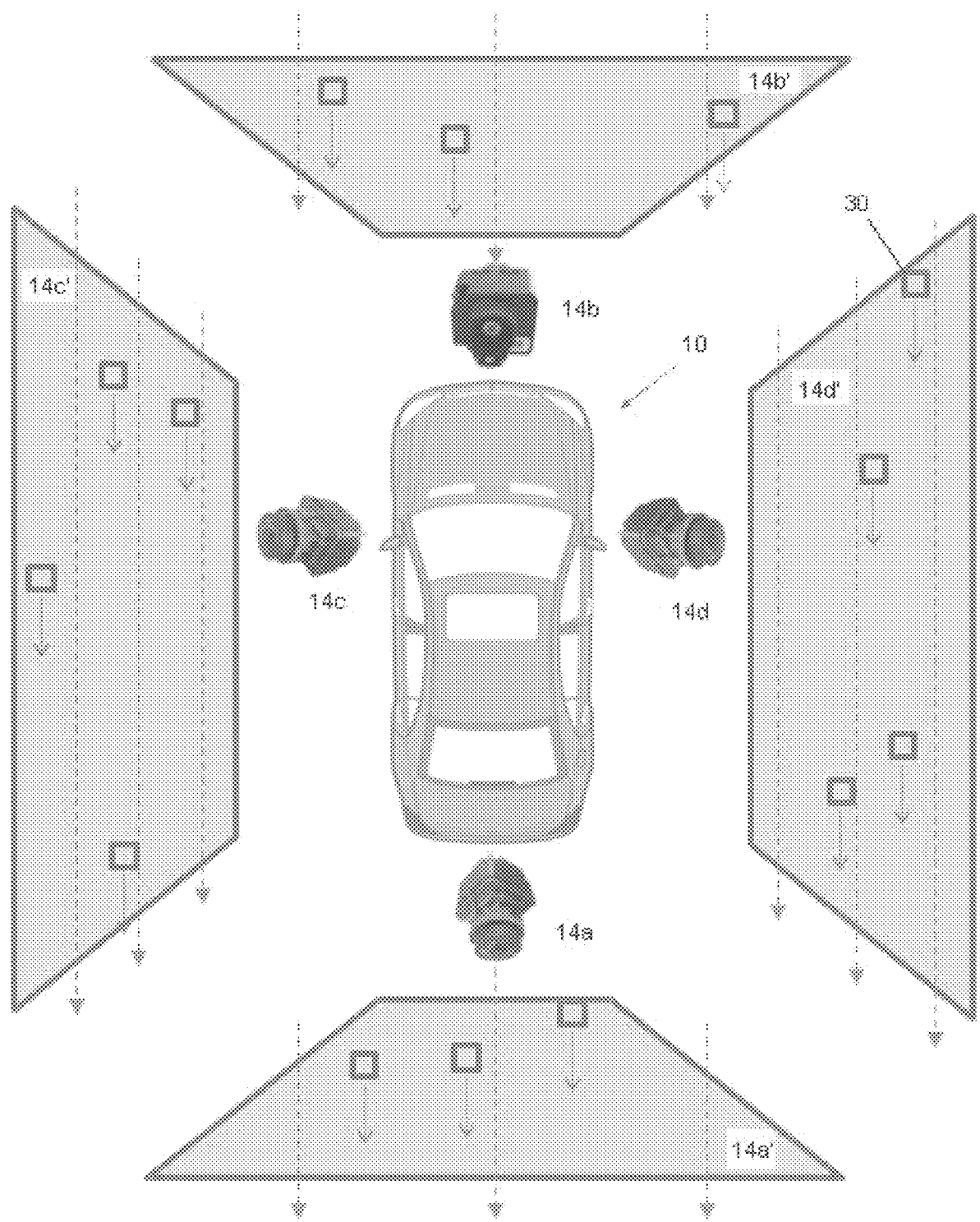
FIG. 8 shows the image portions taken by the respective cameras, which add to a stitched virtual top view image, shown with objects symbolized by boxes passing the scene surrounding the vehicle when the vehicle is driving forward.
Figure 9:
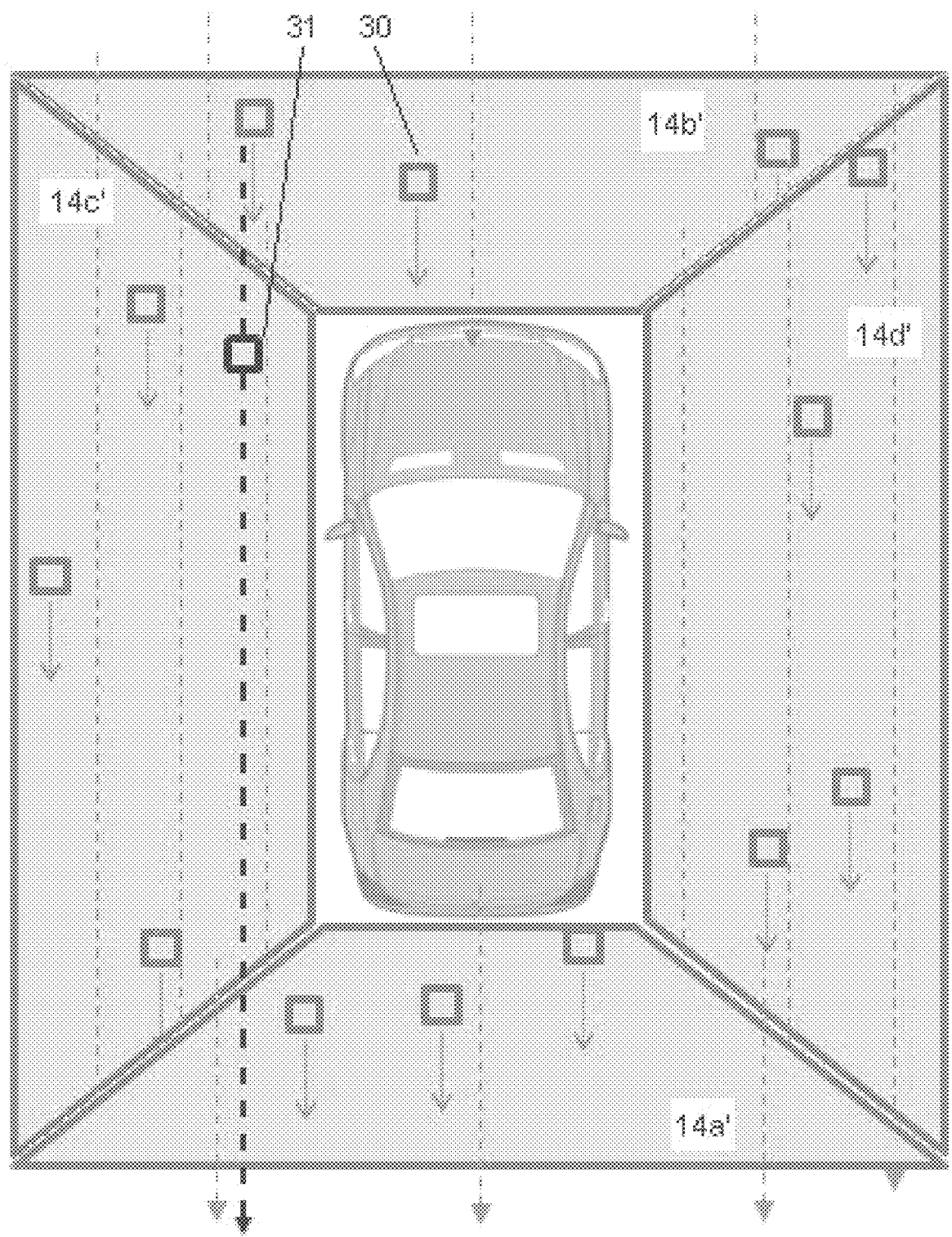
FIG. 9 shows a stitched virtual top view image derived from the image portions, when the vehicle is leveled normally the objects are supposed to pass the scene in generally straight lines when the vehicle is driving straight, shown with a picked out test object highlighted in black.
Figure 10:
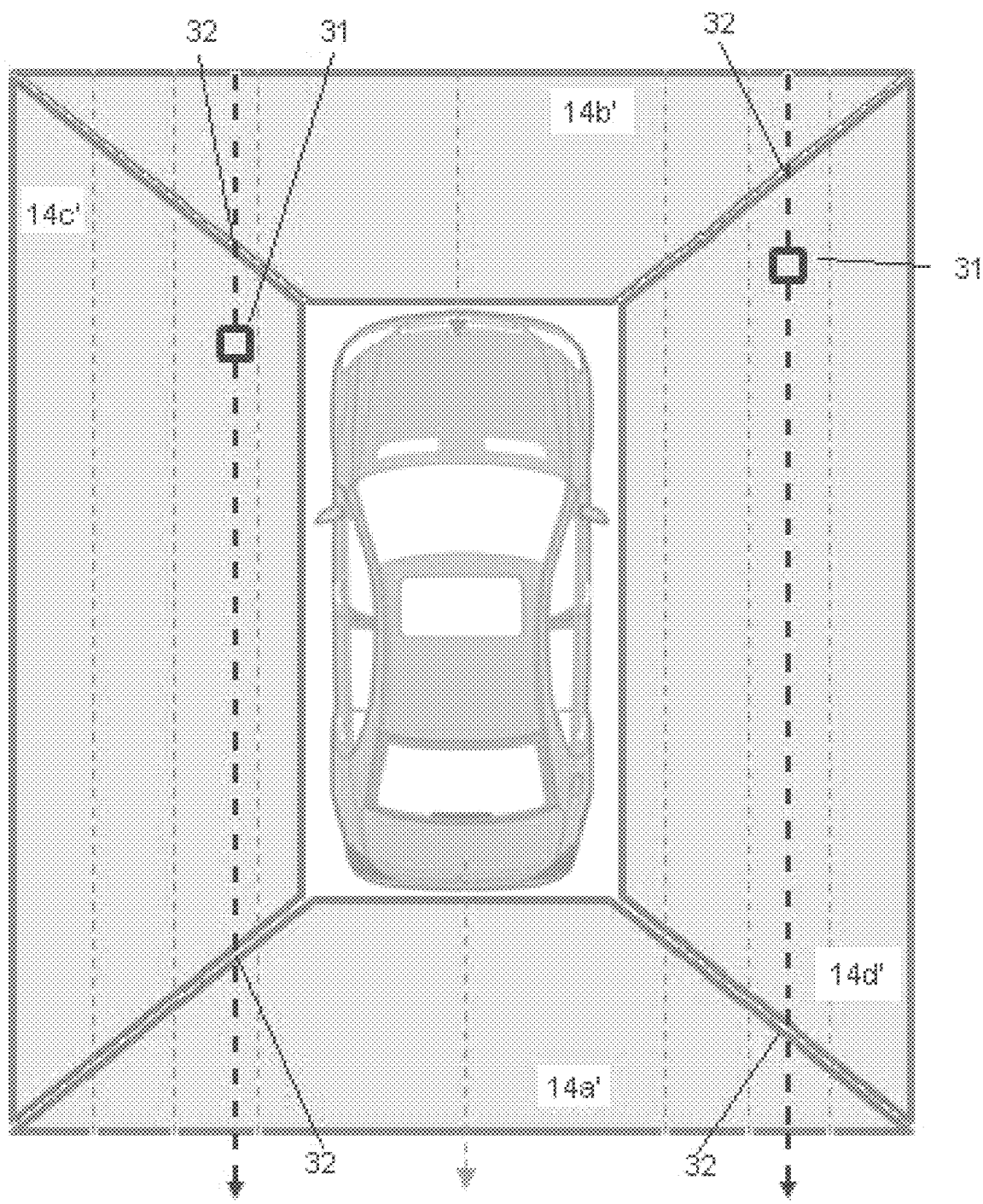
FIG. 10 shows the identical scene as shown in FIG. 9, with two test objects highlighted and other objects erased (for clearer illustration), showing that, when the vehicle is leveled normally, the test objects are supposed to pass the scene in generally straight lines sideward or left and right from the vehicle when the vehicle is driving straight.
Figure 11:
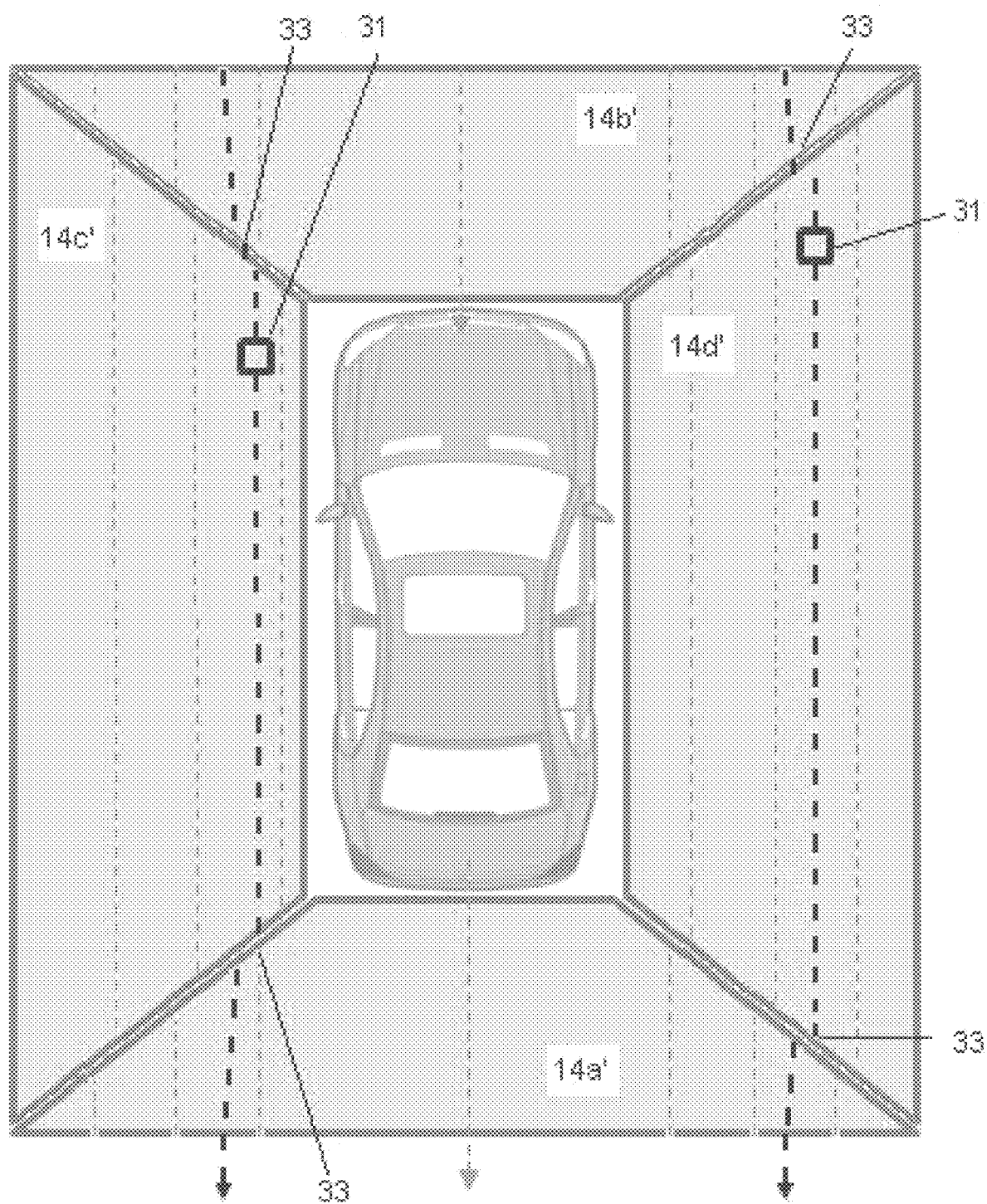
FIG. 11 shows a scene similar to these in FIGS. 9 and 10, with two test objects highlighted, with the vehicle driving straight as in FIGS. 9 and 10, but with the vehicle rolled by an angle $\psi$ to the right, when the rolling angle $\psi$ is uncompensated by the vision system, the passing paths of the tracked (and also the untracked) objects do not follow straight lines and the stitching thresholds do not match any more.

Optionally, when the vehicle is in motion (such as driving forwardly or rearwardly), the ground level calibration may be checked permanently or episodically or from time to time, or preferably at times when the system may have unused processing resources. As shown in FIGS. 8-11, image portions $14a'$, $14b'$, $14c'$ and $14d'$ taken by the respective cameras $14a$, $14b$, $14c$ and $14d$, and are used to create to a stitched virtual top view image. In FIG. 8, objects 30 are shown symbolized by boxes passing the scene surrounding the vehicle when the vehicle is driving forward. A stitched virtual top view image may be derived from the image portions $14a'$, $14b'$, $14c'$ and $14d'$. When the vehicle is leveled normally, the objects 30 are supposed to pass the scene in generally straight lines when the vehicle is driving straight, shown in FIG. 9 with a picked out test object 31 highlighted in black. FIG. 10 shows the identical scene as shown in FIG. 9, with two test objects 31 highlighted and other objects erased (for clearer illustration), showing that, when the vehicle is leveled normally, the test objects 31 are supposed to pass the scene in generally straight lines sideward or left and right from the vehicle when the vehicle is driving straight. FIG. 11 shows a scene similar to these in FIGS. 9 and 10, with two test objects 31 highlighted, with the vehicle driving straight as in FIGS. 9 and 10, but with the vehicle rolled by an angle ψ to the right, when the rolling angle ψ is uncompensated by the vision system, the passing paths of the tracked (and also the untracked) objects do not follow straight lines and the stitching thresholds 33 do not match any more.

The system of the present invention may track objects (such as objects 30 and tracked objects 31 shown in FIGS. 8-11) detected coming into the detection range in front of the vehicle (or to the rear of the vehicle when the vehicle is backing up) and may continue to track these objects when the vehicle is passing the objects and the objects are entering the viewing areas of different cameras (14a to 14d) of the vehicle, such as can be seen with reference to FIGS. 8 and 9. The passing way of the vehicle is known and consistent relative to immobile objects. When an object 31 (tracked) is entering the viewing area (14d' or 14c') of a side camera (14d or 14c), with the object being earlier tracked by the front camera 14b (while passing), the entering point (32 in FIG. 10) and passing way of the object through the side camera image is expectable or predictable.

When there is an offset 33 or a different angle, the side camera will be off by a different angle which points to mis-calibration of the cameras relative to each other (in roll, yaw, pitch angle or transversal displacement) or the vehicle itself is skewed. Typically, both cases can be separated or distinguished by the fact that skewing of the vehicle may happen temporarily while a camera displacement stays in all conditions. Preferably, the system of the present invention may be controlled in a way that first the camera alignment relative to another camera is calibrated and from then on skewing of the vehicle may be assumed when object path inconsistencies appear. Another decision criteria may be that object path inconsistencies may appear (in major) at all four cameras at the same time (such as shown in FIG. 11) during a camera displacement of one camera occurrences inconsistencies within three stitched camera images. When comparing FIG. 10, which shows the case of a leveled vehicle, to FIG. 11, which shows the case of a skewed vehicle (rolled to the right in x axis), the passing ways of objects passing the vehicle on the left side have an offset into the same direction (to the right) as objects passing the vehicle at the right side. Responsive to determination of such skewing or rolling of the vehicle, the system may alter the virtual ground plane in a way that a virtual top view as like in FIG. 10 results.

Additionally or optionally, the system may also take an input from an environmental sensor 28 (beside the cameras) into account. If not done by the vision computing system alone, the system may utilize distance measuring sensors, such as, for example, ultrasound (exemplary case in FIGS. 7A and 7B), Time of Flight (TOF), RADAR, LIDAR, LADAR and/or the like, for detecting the true ground plane level and elevations 25 near by the vehicle 10 (the detection range which may have (still) adequate resolution may be from about 0.2 m up to about 10 m depending on the sensors type (equates to ultrasound cloud 29 in FIGS. 7A and 7B)) for feeding it into the vision system to correct the virtual (assumed) ground plane for the virtual top view vision projection in the manner the vehicle is rolled or pitched. The system either may detect changes for adding/subtracting delta tunings or absolute values for plain input.

Figure 7B:
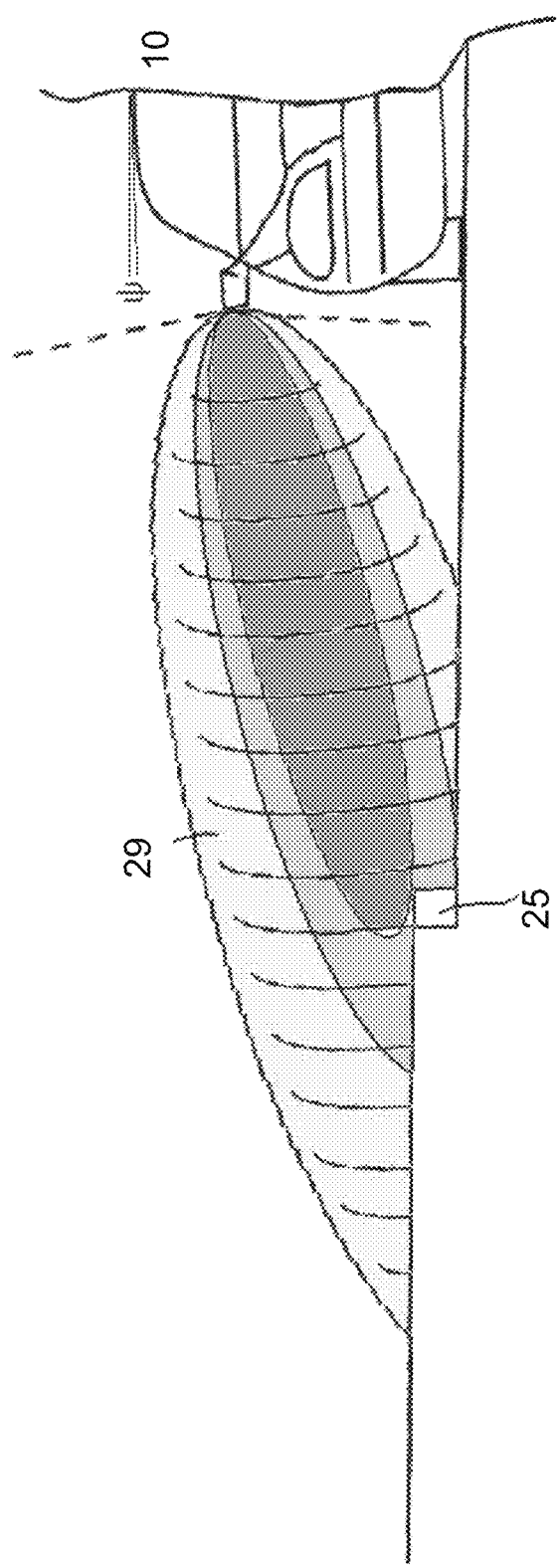
FIG. 7B shows a vehicle similar to FIG. 7A, but with the vehicle rolled to its right by an angle $\psi$, with the measuring system that rolls with the vehicle detecting a closer distance to objects and the ground.

For example, and as shown in FIGS. 7A and 7B, the vehicle 10 may include an ultrasound distance measuring system having an ultrasound sensor 28 integrated into a side mirror housing 27 of the vehicle 10. The ultrasound sensor 28 is shown with an effective ultrasound expansion cloud illustration 29 (not actually visible), and shown with the vehicle in a horizontal level. If the vehicle is rolled or tilted to its right by an angle iv, the measuring system, which rolls with the vehicle, detects a closer distance to objects and the ground. FIG. 7B shows a vehicle turned by an angle ψ (rolled in x axis) in comparison to a leveled car in FIG. 7A. The system may detect the ground or at least elevated objects on the ground 25 are coming closer to the mirror integrated sensor due to that rolling of the vehicle by the angle iv. The sensor data may come as a depth image or in a point cloud which may need to be combined with the image giving (camera) system image data by sensor fusion. The ground plane, objects (with elevation) and horizon may be distinguishable by processing of sensor data.

As an additional or alternative way to detect that the vehicle is not fully leveled horizontally (rolled in x axis) and/or has a pitch angle (in y axis) or the like, the system may utilize the compression ratio of the shock absorber system or suspension system of all wheels shock absorbers of the vehicle. Nowadays vehicles usually have sensors to detect the compression rate and usually this signal is provided via the vehicle's CAN or vehicle bus network, which makes it possible that the vision system is able to process this information. By such processing of suspension information (for the individual wheels of the vehicle) the system may determine uneven suspension of the corner regions of the vehicle and may correct the virtual (assumed) ground plane for the virtual top view vision projection in accordance with the determined ratio that the vehicle is rolled or pitched (skewed).

As a preferred embodiment, the system of the present invention may determine the ground level calibration roughly on hand of the shock absorber sensor or suspension data (via CAN) and may use the optical calibration referred to above as a successive fine tuning procedure, which may use the optional range sensor data in addition or in backup.

It is desirable for vision overlays to look quite artificial when these become mapped over a real scene view captured by automotive cameras. Earlier filings, such as International Publication No. WO 2013/086249, which is hereby incorporated herein by reference in its entirety, use visual effects such as 'motion blurring' and/or partially transparency in dependence of the viewing distance and direction of the virtual camera to help this fact. Nevertheless there is room for improvement.

As soon as the 3D shape or topography of the world within a displayed scene (in an automotive vision system) is known (using a mono camera and 3D recognition by 'structure from motion' or 'structure from focal length' or 'depths estimation from focal blur' (known from known TV 2D to 3D conversion algorithms (TP-Vision in Philips TV) or by using stereo cameras (including infrared) or using a mono camera and additionally a second or non-vision-based sensor system, such as LIDAR, RADAR, TOF or the like), especially the ground surface structure the car is resting on, will be renderable. The overlays of the present invention may be mapped or placed (or calculated or controlled or adjusted) responsive to the world's topographical structure. Such overlays may utilize aspects of the overlays described in International Publication No. WO 2009036176, which is hereby incorporated herein by reference in its entirety.

Overlays related to the subject or equipped or host vehicle and overlays dedicated to other vehicles, infrastructure or points of interest (POI) may be mapped onto the structures' topography as like projected or dropped from over top. By that the overlays cover the mapping structure folding around all ups and downs which strengthens the three dimensional impression of the scenery (see FIG. 12 (flat overlay)), since the top of the overlay may follow to the topography.

The overlays may have a three dimensional structure which top elevation may be responsive to the ground plane (virtually). By that the top of the overlay repeats the topography of its ground plane (See FIG. 13 (solid overlay)).

The two and three dimensional overlays may be fully or partially transparent for preventing anything important in the scene is hidden by an overlay (and not detected or as important classified). See FIG. 14 (transparent overlay).

Figure 12:
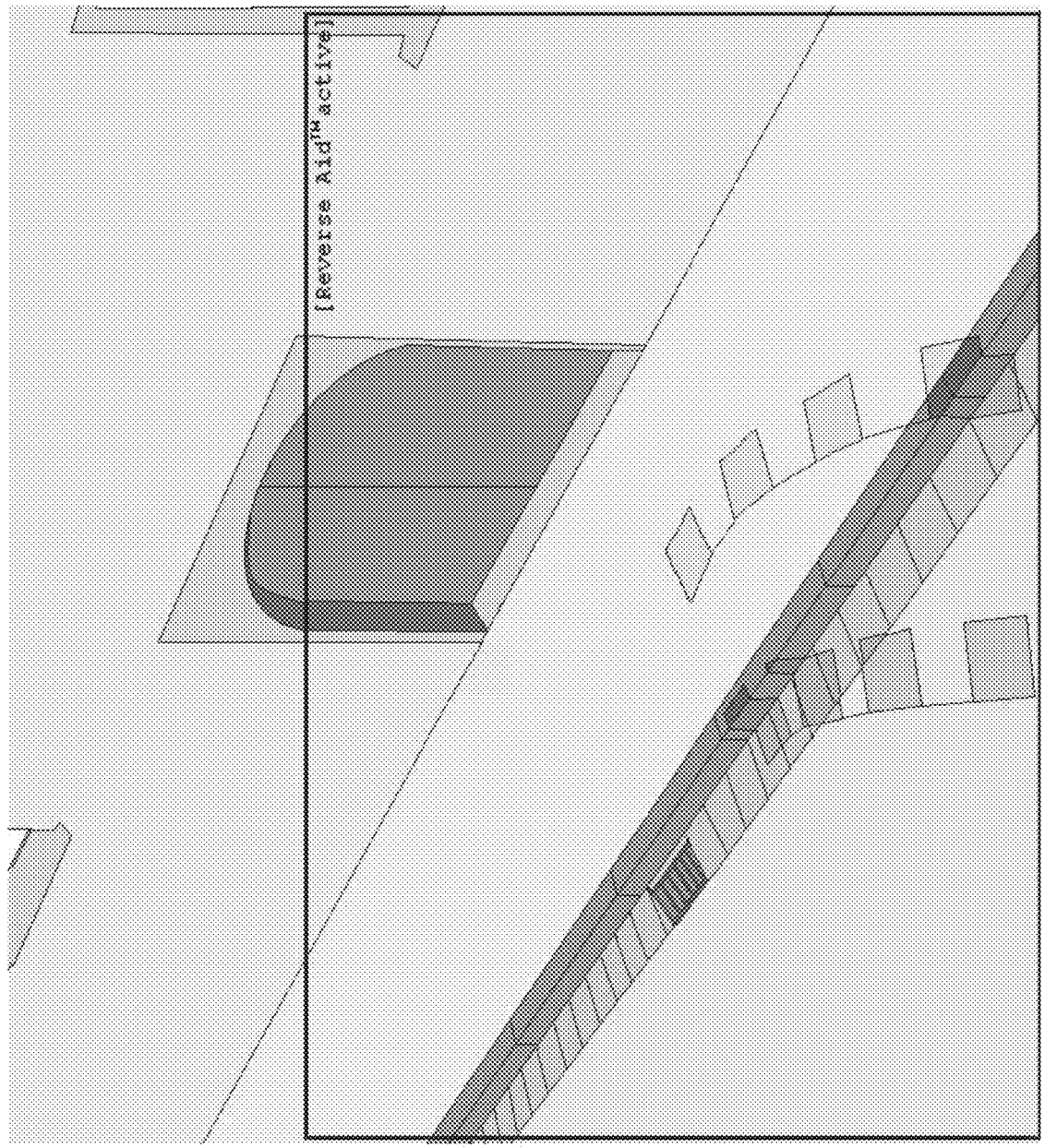
FIGS. 12-14 are perspective views of a parking maneuvering situation (partially on the sidewalk), showing overlays in accordance with the present invention.
Figure 13:
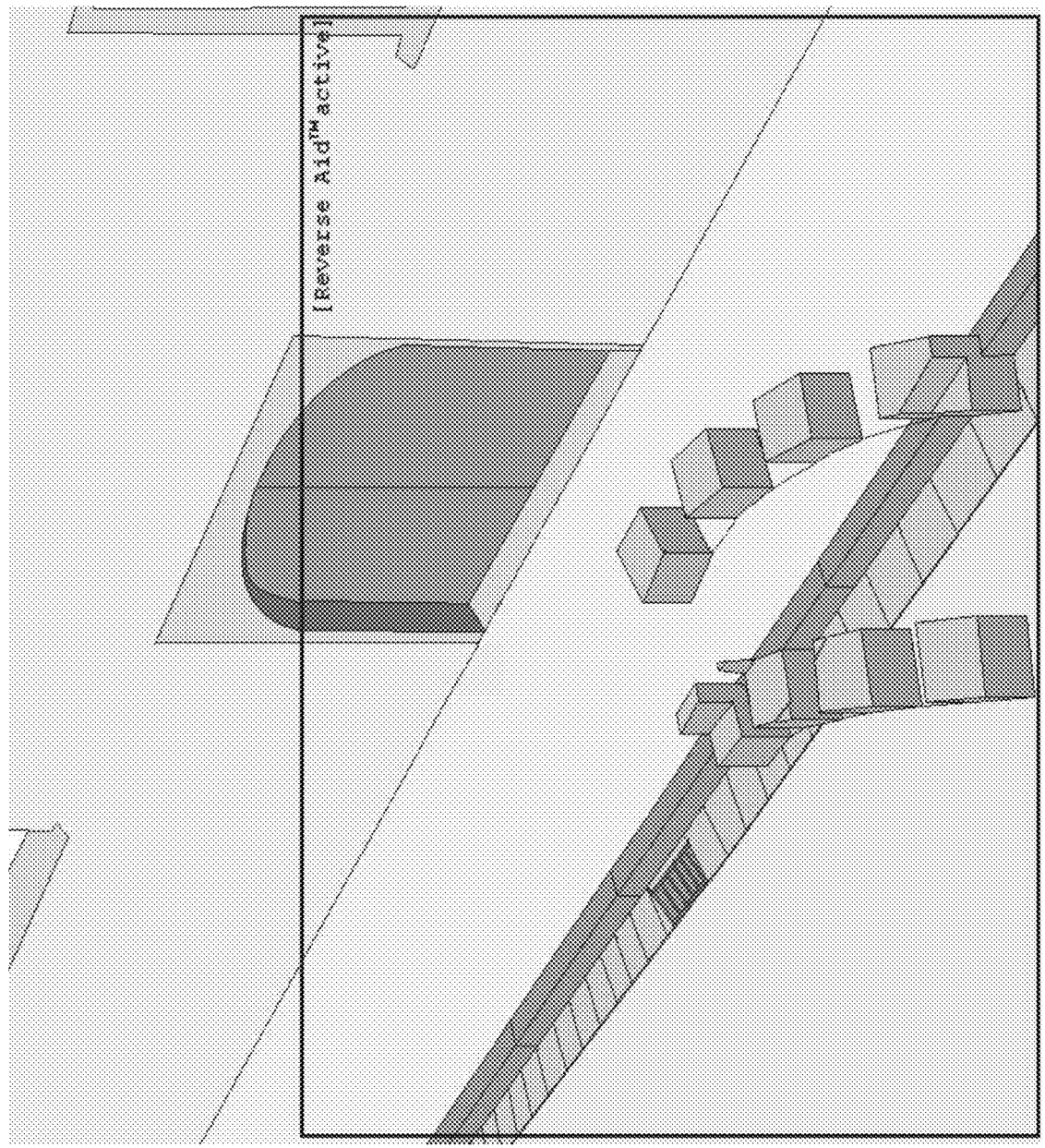
Figure 14:
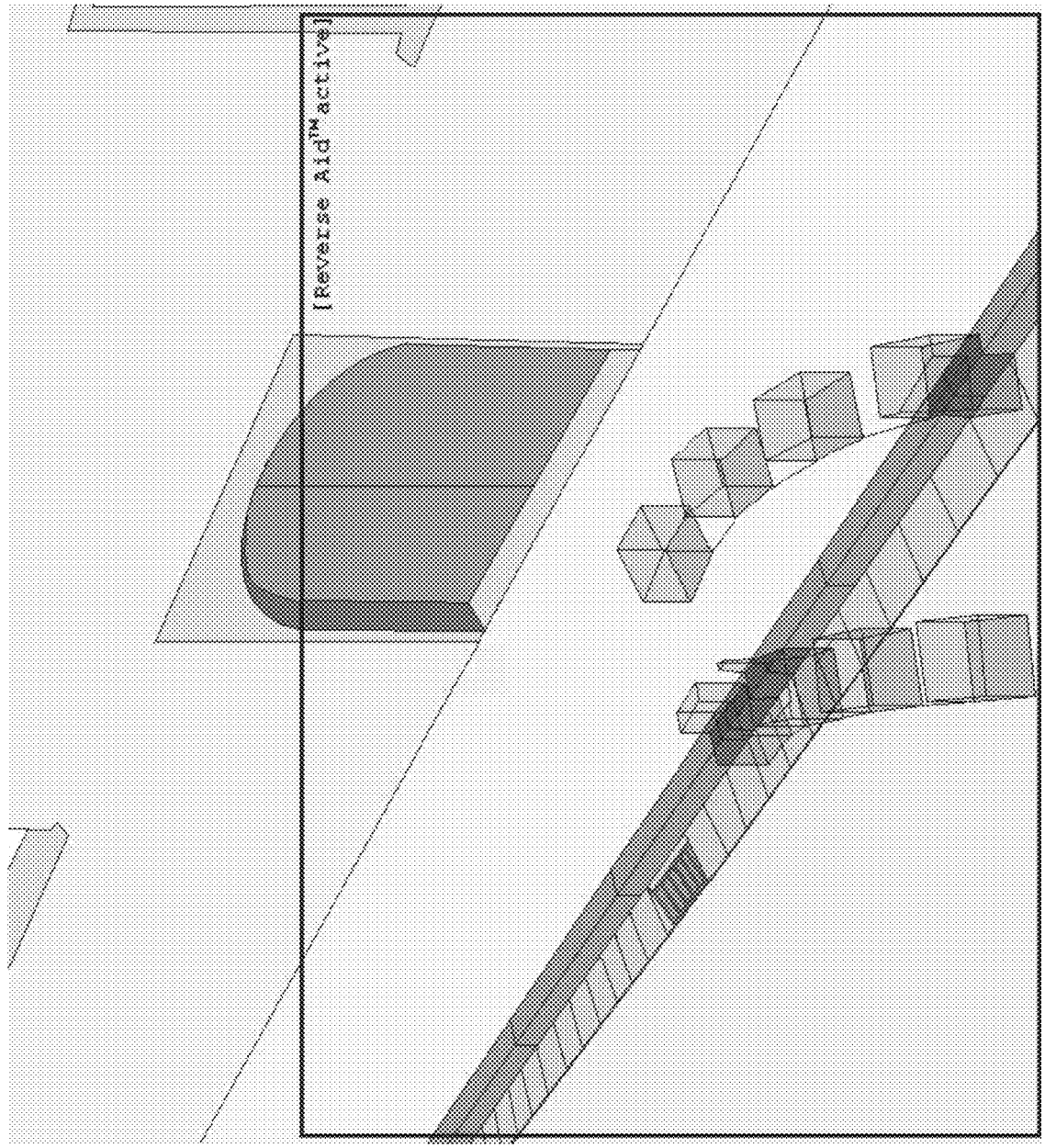

FIGS. 12, 13 and 14 have in common a scene of a pedestrian side walk along a road. The displayed view, which may be displayed at a vehicle's compartment display when the vehicle is reversing into a long side parking spot, is indicated by the box or outline. As common, the curvature of the reversing path according to the steering wheel angle or the automated path planning system is indicated by the line of (positions of) overlays. The overlays may have different colors according to the distance to the vehicle's rear. The overlays may have different colors or may change color or blink or flash or may alter in transparency or in brightness or may be animated, such as by torsion, wobbling, vibrating or jumping (such as in a manner like jelly or the like), responsive to the distance to the vehicle's rear, the speed at which possible colliding hazards or possible damage threatening objects may close to the vehicle (or that the vehicle may close to the objects), or the remaining (eventually estimated, by the trajectory in past) time until closing to an object or the like. In all three of FIGS. 12-14, the examples of the vehicle's driving path lead or progress substantially or massively up the curb at the side of the road and over the side walk. The curbs may be visible by the step in heights of the overlay's top and optionally additionally by a thread indication or highlighting as described above (such as by a change in color, blinking, brightness or animation or the like).

Figure 15:
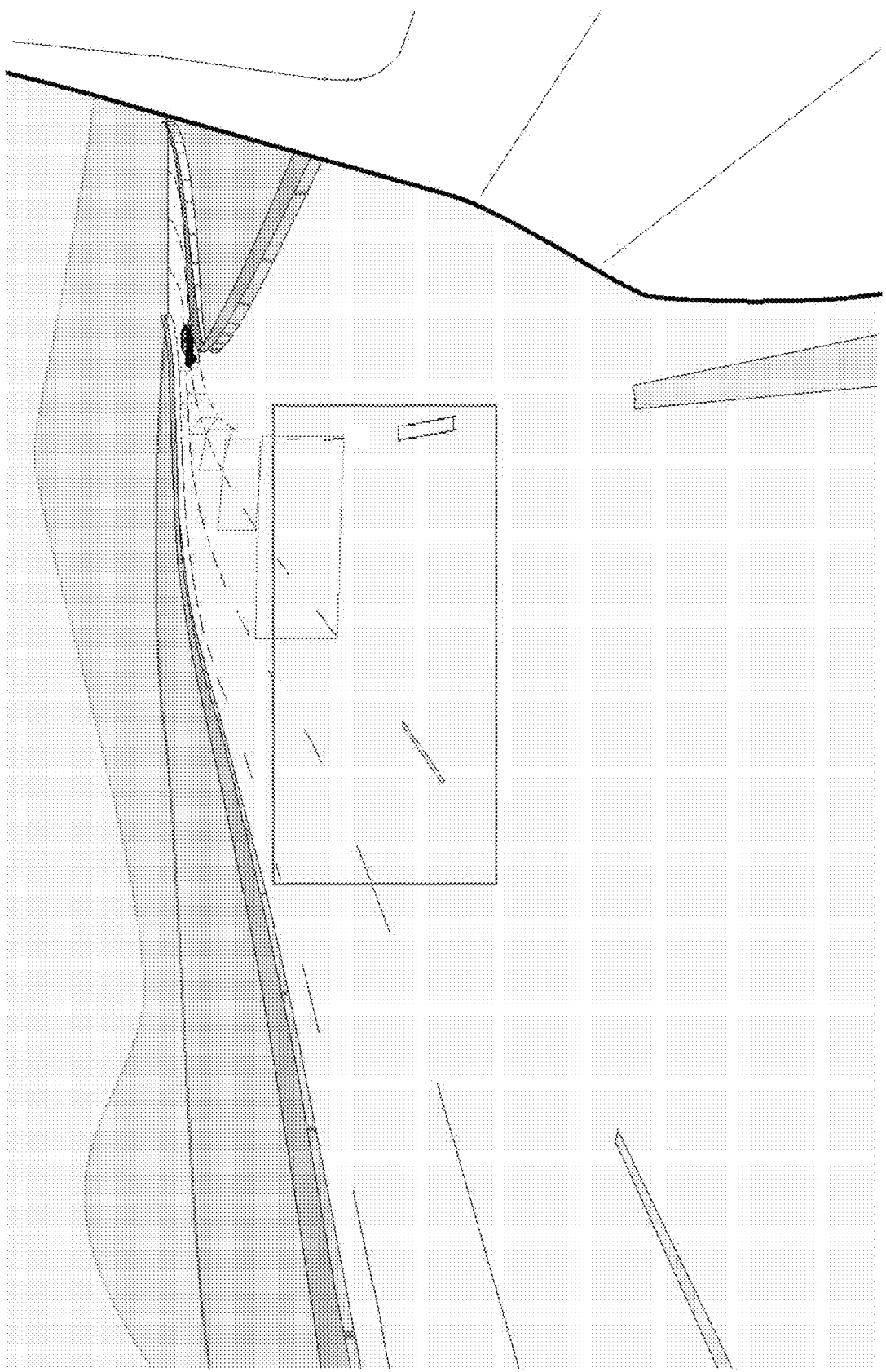
FIGS. 15-17 are perspective views of a highway situation, showing overlays in a view such as may be shown in a rearview side mirror replacement camera display in accordance with the present invention.
Figure 16:
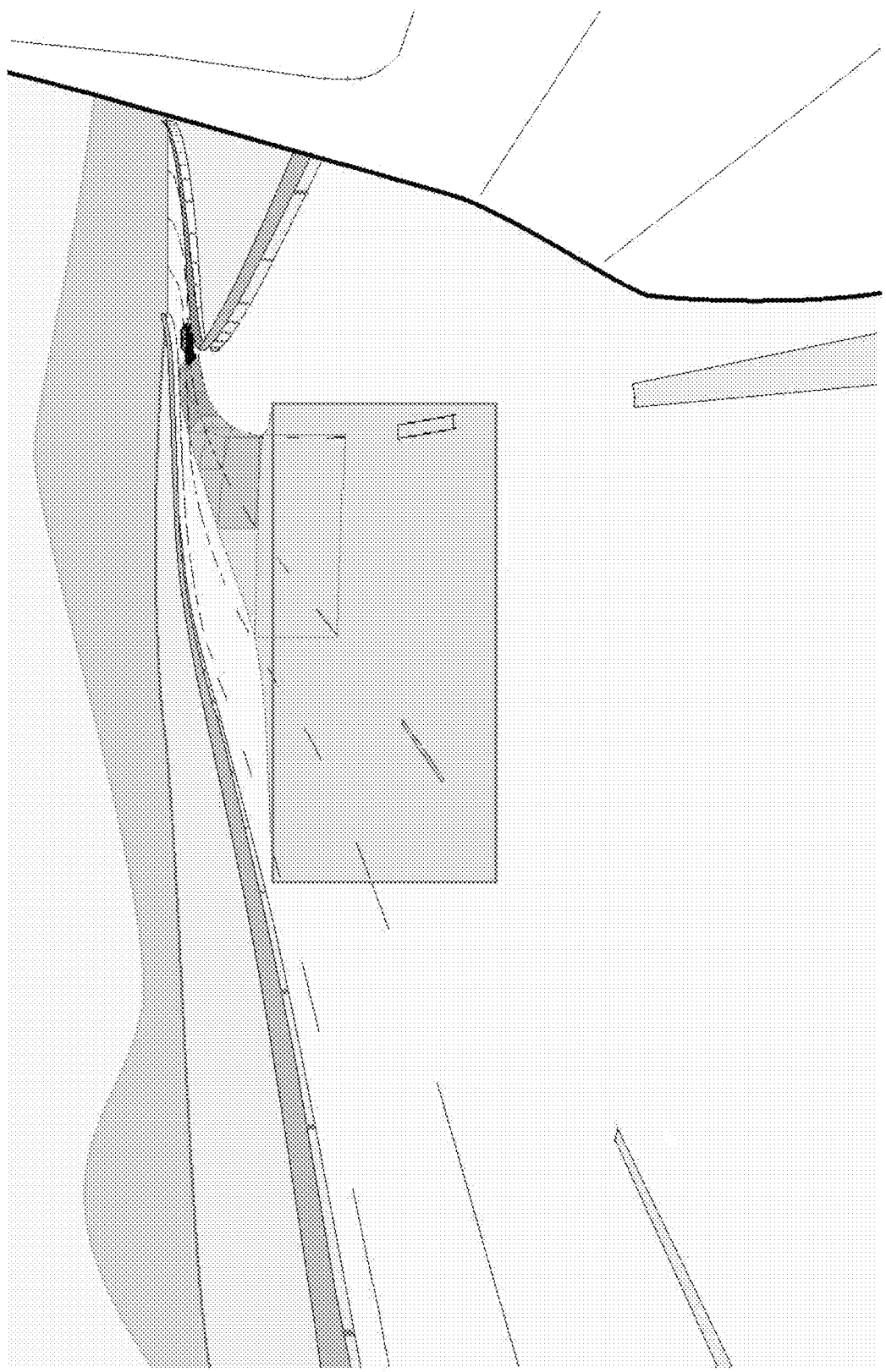
Figure 17:
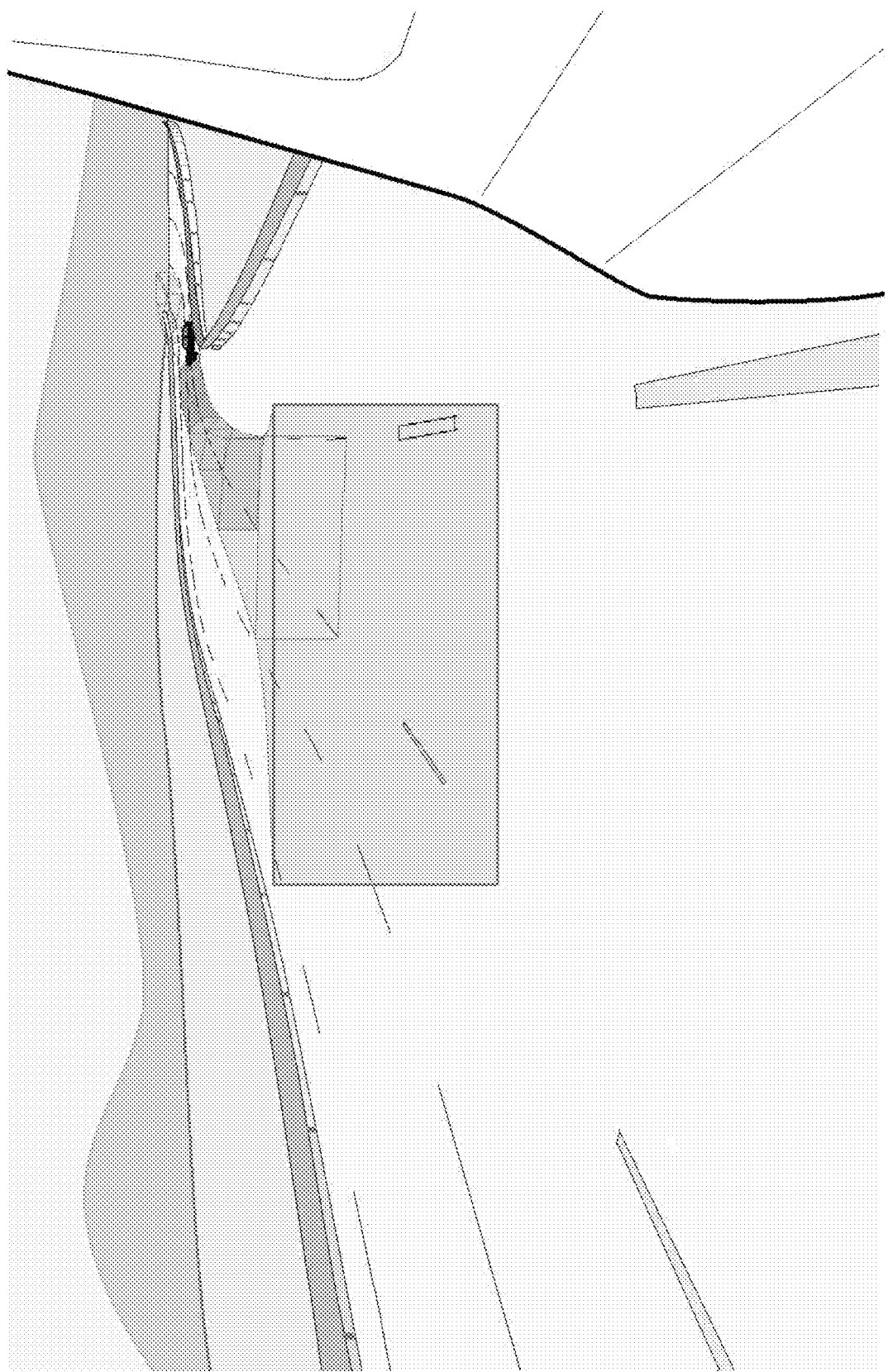

With reference now to FIG. 15, the system of the present invention may visualize that the arrangement of the overlays may reflect the three dimensional topography of a scene. The shown perspective views of a freeway situation, such as may be displayed in a rearview mirror replacement camera display (such as by utilizing aspects of the systems described in U.S. provisional application Ser. No. 61/935,057, filed Feb. 3, 2014, which has now been filed as U.S. patent application Ser. No. 14/898,493, filed Dec. 15, 2015, and published on May 19, 2016 as U.S. Publication No. US-2016-0137126), may be used for visualizing or displaying the projected path of a vehicle driving behind the subject or equipped vehicle but in another lane. Due to the overlayed boxes (which may have different highlightings as described above) following the prospective projected path of the following vehicle, the equipped vehicle's driver may be able to readily capture at which specific lane the following vehicle is approaching.

Not shown in the drawings is that when the overlays infringe (take the same space) another (real or virtual) object, the overlays may appear in a faded color or in dot or dashed or phantom lines. Optionally, the objects may pile on top of each other (when running across a wall for example). Optionally, the overlays may shrink in size or step slightly to the side when logically possible. For example, an inserted 'Point of Interest Label' may give way to a parking overlay which position is systematically crucial.

It is also desirable to gather and provide context depending labeling of information in vehicle vision systems. Storing a lot of information on board the vehicle takes a lot of storage space and it may become outdated comparably fast. Solutions are known to provide useful information to the car aid systems and to the driver via wireless radio channels from and to a dedicated server or from the world wide web, such as by utilizing aspects of the systems described in U.S. patent application Ser. No. 13/660,306, filed Oct. 25, 2012, now U.S. Pat. No. 9,146,898, which is hereby incorporated herein by reference in its entirety. New standards are coming up as like HTML5. This is for providing displaying contents. To maintain the displaying contents up to date adds costs to the system. These costs may be fully or partially borne by third party providers. These may finance their services by adding commercial contents to the 'useful contents'. For example, these providers may employ a service for 'points of interest' (POI) which may come up as virtual labels added to real camera taken scenes of an urban street or environment. The providers may collect money from stores and the company or store logos or labels may be presented in a preferred or selected manner (such as in the foreground, brighter, bigger, more exposed, blinking, or the like).

The vision system of the present invention may employ a spam filter for incoming foreign viewing contents. The spam filter properties may be configurable. The configuration may come from third parties or may be done by the vision system provider or by the vehicle OEM or by the vehicle owner itself (over an HMI) or from a remote device or system (such as, for example, a cell phone app or the like). The spam filter properties may be context dependent (situational, position dependent, vehicle state dependent, vehicle occupation or occupant dependent, driving state dependent). For example there may be contents preferred by the adult occupants, while other or additional contents may become displayed only when a teenager is also on board the vehicle. For example, the teenager may love fast food restaurants while the parents prefer exquisite restaurants. Thus, the vision display system may show POIs of all types of restaurants when the children are in the vehicle with their parents, but will show just some exquisite flagged restaurants when the parents are alone in the vehicle. The "flagging" may come from the vision system provider, by the vehicle OEM or by the vehicle owner itself (over an HMI) or from remote (such as, for example, a cell phone app). Besides that all other annoying content may be optionally suppressible by a spam filter.

Optionally, there may be different spam filter property data sets that the vehicle users are able to store in the vehicle data storage on their cell phone or remote. It may be possible that the spam filter properties (and all other vision system settings) may stay with the driver which ever vehicle he or she uses. The data set may be downloaded from a remote location (server) via any data channel or transferred by his/her cell phone.

The vision system may collect POIs by itself such as, for example, by employing an object detection algorithm on known labels or by requesting the background content according to detected maybe unknown labels. The found POIs may be distributed in a database common to all or to certified users.

Optionally, the vision system (utilizing the forward facing camera and a rearward facing camera and other cameras disposed at the vehicle with exterior fields of view) may be part of or may provide a display of a top-down view or birds'-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/

081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/116043; WO 2012/145313; WO 2012/145501; WO 2012/145818; WO 2012/145822; WO 2012/158167; WO 2012/075250; WO 2012/116043; WO 2012/145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or U.S. patent application Ser. No. 14/163,325, filed Jan. 24, 2014, and published on Jul. 31, 2014 as U.S. Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published Jun. 19, 2014 as U.S. Publication No. US-2014-0168437; Ser. No. 14/098,817, filed Dec. 6, 2013, and published Jun. 19, 2014 as U.S. Publication No. US-2014-0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,707,896; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published on Jan. 23, 2014 as U.S. Publication No. US-2014-0025240; Ser. No. 13/942,753, filed Jul. 16, 2013, and published Jan. 30, 2014 as U.S. Publication No. US-2014-0028852; Ser. No. 13/927,680, filed Jun. 26, 2013, and published Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, and published Aug. 29, 2013 as U.S. Publication No. US-2013-0222593; Ser. No. 13/851,378, filed Mar. 27, 2013, now U.S. Pat. No. 9,319,637; Ser. No. 13/848,796, filed Mar. 22, 2012, and published Oct. 24, 2013 as U.S. Publication No. US-2013-0278769; Ser. No. 13/847,815, filed Mar. 20, 2013, and published Oct. 31, 2013 as U.S. Publication No. US-2013-0286193; Ser. No. 13/800,697, filed Mar. 13, 2013, and published Oct. 3, 2013 as U.S. Publication No. US-2013-0258077; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. Publication No. US-2013-0002873, and/or U.S. provisional applications, Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/893,489, filed Oct. 21, 2013; Ser. No. 61/886,883, filed Oct. 4, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/766,883, filed Feb. 20, 2013; Ser. No. 61/760,366, filed Feb. 4, 2013, and/or Ser. No. 61/760,364, filed Feb. 4, 2013, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Pat. Publication No. US-2009-0244361 and/or U.S. patent application Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular vision system, the vehicular vision system comprising:

a plurality of cameras disposed at a vehicle equipped with the vehicular vision system, the plurality of cameras capturing image data as the equipped vehicle is driven along a traffic lane of a road;

wherein the plurality of cameras comprises (i) a rear camera disposed at a rear portion of the equipped vehicle and having a field of view at least rearward of the equipped vehicle and (ii) side cameras disposed at respective side portions of the equipped vehicle, and wherein the side cameras comprise (a) a left-side camera disposed at a left side portion of the equipped vehicle and having a field of view at least sideward and rearward of the equipped vehicle and (b) a right-side camera disposed at a right side portion of the equipped vehicle and having a field of view at least sideward and rearward of the equipped vehicle;

a processor disposed at the equipped vehicle;

wherein image data captured by cameras of the plurality of cameras is provided to the processor;

wherein captured image data provided to the processor is processed to detect a rearward-approaching vehicle that is approaching the equipped vehicle from rearward of the equipped vehicle and that is present in the field of view of at least one camera of the plurality of cameras;

a video display device disposed at the equipped vehicle, the video display device comprising a video display screen that is viewable by a driver of the equipped vehicle;

wherein the video display screen is operable to display video images derived from image data captured by at least one camera of the plurality of cameras;

wherein, as the equipped vehicle is driven along the traffic lane of the road, and responsive to detection of the rearward-approaching vehicle via processing of captured image data, the vehicular vision system determines a path of travel of the detected rearward-approaching vehicle;

wherein, as the equipped vehicle is driven along the traffic lane of the road, and responsive to determining that the path of travel of the detected rearward-approaching vehicle is along a side traffic lane adjacent to the traffic lane along which the equipped vehicle is driven, the vehicular vision system (i) displays at the video display screen video images derived at least from image data captured by the side camera that is at the side portion of the equipped vehicle that is adjacent to the side traffic lane and (ii) overlays a graphic overlay overlaying the displayed video images that is based on the determined path of travel of the detected rearward-approaching vehicle; and wherein the graphic overlay comprises a partially transparent graphic overlay.

2. The vehicular vision system of claim 1, wherein the field of view of the left-side camera partially overlaps the field of view of the rear camera, and wherein the field of view of the right-side camera partially overlaps the field of view of the rear camera.

3. The vehicular vision system of claim 1, wherein the graphic overlay overlaying the displayed video images is indicative of the determined path of travel of the detected rearward-approaching vehicle.

4. The vehicular vision system of claim 1, wherein the partially transparent graphic overlay overlays a portion of the displayed video images, and wherein the video images displayed at that portion are at least partially viewable by the driver of the equipped vehicle through the partially transparent graphic overlay.

5. The vehicular vision system of claim 1, comprising a non-imaging sensor disposed at the equipped vehicle and having a field of sensing at least rearward of the equipped vehicle, the non-imaging sensor capturing sensor data as the equipped vehicle is driven along the traffic lane of the road.

6. The vehicular vision system of claim 5, wherein the vehicular vision system, via processing of sensor data captured by the non-imaging sensor, determines distance to the detected rearward-approaching vehicle.

7. The vehicular vision system of claim 5, wherein the vehicular vision system, via processing of sensor data captured by the non-imaging sensor, determines a change in distance to the detected rearward-approaching vehicle.

8. The vehicular vision system of claim 5, wherein the non-imaging sensor comprises a radar sensor.

9. The vehicular vision system of claim 5, wherein the non-imaging sensor comprises a lidar sensor.

10. The vehicular vision system of claim 5, wherein the non-imaging sensor comprises a left-side non-imaging sensor accommodated in a left-side exterior rearview mirror at the left side portion of the equipped vehicle and a right-side non-imaging sensor accommodated in a right-side exterior rearview mirror at the right side portion of the equipped vehicle.

11. The vehicular vision system of claim 1, wherein the graphic overlay comprises a plurality of rectangular overlays overlaying where the side traffic lane is displayed in the displayed video images.

12. The vehicular vision system of claim 1, wherein, as the equipped vehicle is driven along the traffic lane of the road, and responsive to determining that the path of travel of the detected rearward-approaching vehicle is along a left-side side traffic lane adjacent to the traffic lane along which the equipped vehicle is driven, the vehicular vision system displays at the video display screen video images derived at least from image data captured by the left-side camera.

13. The vehicular vision system of claim 1, wherein, as the equipped vehicle is driven along the traffic lane of the road, and responsive to determining that the path of travel of the detected rearward-approaching vehicle is along a right-side side traffic lane adjacent to the traffic lane along which the equipped vehicle is driven, the vehicular vision system displays at the video display screen video images derived at least from image data captured by the right-side camera.

14. The vehicular vision system of claim 1, wherein the processor processes captured image data over multiple frames of captured image data to track the detected rearward-approaching vehicle as it approaches the equipped vehicle.

15. The vehicular vision system of claim 1, wherein the processor processes captured image data over multiple frames of captured image data to track the detected rearward-approaching vehicle as it overtakes the equipped vehicle.

16. The vehicular vision system of claim 1, wherein the left-side camera is disposed at a left-side exterior rearview mirror at the left side portion of the equipped vehicle, and wherein the right-side camera is disposed at a right-side exterior rearview mirror at the right side portion of the equipped vehicle.

17. The vehicular vision system of claim 1, wherein the video display screen is disposed at an interior rearview mirror assembly of the equipped vehicle.

18. A vehicular vision system, the vehicular vision system comprising:
a plurality of cameras disposed at a vehicle equipped with the vehicular vision system, the plurality of cameras capturing image data as the equipped vehicle is driven along a traffic lane of a road;
wherein the plurality of cameras comprises (i) a rear camera disposed at a rear portion of the equipped vehicle and having a field of view at least rearward of the equipped vehicle and (ii) side cameras disposed at respective side portions of the equipped vehicle, and wherein the side cameras comprise (a) a left-side camera disposed at a left-side exterior rearview mirror at a left side portion of the equipped vehicle and having a field of view at least sideward and rearward of the equipped vehicle and (b) a right-side camera disposed at a right-side exterior rearview mirror at a right side portion of the equipped vehicle and having a field of view at least sideward and rearward of the equipped vehicle;
a processor disposed at the equipped vehicle;
wherein image data captured by cameras of the plurality of cameras is provided to the processor;
wherein captured image data provided to the processor is processed to detect a rearward-approaching vehicle that is approaching the equipped vehicle from rearward of the equipped vehicle and that is present in the field of view of at least one camera of the plurality of cameras;
a video display device disposed at an interior rearview mirror assembly of the equipped vehicle, the video display device comprising a video display screen that is viewable by a driver of the equipped vehicle;
wherein the video display screen is operable to display video images derived from image data captured by at least one camera of the plurality of cameras;
wherein, as the equipped vehicle is driven along the traffic lane of the road, and responsive to detection of the rearward-approaching vehicle via processing of captured image data, the vehicular vision system determines a path of travel of the detected rearward-approaching vehicle;
wherein, as the equipped vehicle is driven along the traffic lane of the road, and responsive to determining that the path of travel of the detected rearward-approaching vehicle is along a side traffic lane adjacent to the traffic lane along which the equipped vehicle is driven, the vehicular vision system (i) displays at the video display screen video images derived at least from image data captured by the side camera that is at the side portion of the equipped vehicle that is adjacent to the side traffic lane and (ii) overlays a graphic overlay overlaying the displayed video images that is based on the determined path of travel of the detected rearward-approaching vehicle; and
wherein the graphic overlay comprises a partially transparent graphic overlay.

19. The vehicular vision system of claim 18, wherein the field of view of the left-side camera partially overlaps the field of view of the rear camera, and wherein the field of view of the right-side camera partially overlaps the field of view of the rear camera.

20. The vehicular vision system of claim 18, wherein the graphic overlay overlaying the displayed video images is indicative of the determined path of travel of the detected rearward-approaching vehicle.

21. The vehicular vision system of claim 18, wherein the partially transparent graphic overlay overlays a portion of the displayed video images, and wherein the video images displayed at that portion are at least partially viewable by the driver of the equipped vehicle through the partially transparent graphic overlay.

22. The vehicular vision system of claim 18, wherein the graphic overlay comprises a plurality of rectangular overlays overlaying where the side traffic lane is displayed in the displayed video images.

23. The vehicular vision system of claim 18, wherein, as the equipped vehicle is driven along the traffic lane of the road, and responsive to determining that the path of travel of the detected rearward-approaching vehicle is along a left-side side traffic lane adjacent to the traffic lane along which the equipped vehicle is driven, the vehicular vision system displays at the video display screen video images derived at least from image data captured by the left-side camera.

24. The vehicular vision system of claim 18, wherein, as the equipped vehicle is driven along the traffic lane of the road, and responsive to determining that the path of travel of the detected rearward-approaching vehicle is along a right-side side traffic lane adjacent to the traffic lane along which the equipped vehicle is driven, the vehicular vision system displays at the video display screen video images derived at least from image data captured by the right-side camera.

25. The vehicular vision system of claim 18, wherein the processor processes captured image data over multiple frames of captured image data to track the detected rearward-approaching vehicle as it approaches the equipped vehicle.

26. The vehicular vision system of claim 18, wherein the processor processes captured image data over multiple frames of captured image data to track the detected rearward-approaching vehicle as it overtakes the equipped vehicle.

27. A vehicular vision system, the vehicular vision system comprising:
a plurality of cameras disposed at a vehicle equipped with the vehicular vision system, the plurality of cameras capturing image data as the equipped vehicle is driven along a traffic lane of a road;
wherein the plurality of cameras comprises (i) a rear camera disposed at a rear portion of the equipped vehicle and having a field of view at least rearward of the equipped vehicle and (ii) side cameras disposed at respective side portions of the equipped vehicle, and wherein the side cameras comprise (a) a left-side camera disposed at a left-side exterior rearview mirror at a left side portion of the equipped vehicle and having a field of view at least sideward and rearward of the equipped vehicle and (b) a right-side camera disposed at a right-side exterior rearview mirror at a right side portion of the equipped vehicle and having a field of view at least sideward and rearward of the equipped vehicle;
a processor disposed at the equipped vehicle;
wherein image data captured by cameras of the plurality of cameras is provided to the processor;
wherein captured image data provided to the processor is processed to detect a rearward-approaching vehicle that is approaching the equipped vehicle from rearward of the equipped vehicle and that is present in the field of view of at least one camera of the plurality of cameras;
a non-imaging sensor disposed at the equipped vehicle and having a field of sensing at least rearward of the equipped vehicle, the non-imaging sensor capturing sensor data as the equipped vehicle is driven along the traffic lane of the road;
wherein the vehicular vision system, via processing of sensor data captured by the non-imaging sensor, determines distance to the detected rearward-approaching vehicle;
a video display device disposed at the equipped vehicle, the video display device comprising a video display screen that is viewable by a driver of the equipped vehicle;
wherein the video display screen is operable to display video images derived from image data captured by at least one camera of the plurality of cameras;
wherein, as the equipped vehicle is driven along the traffic lane of the road, and responsive to detection of the rearward-approaching vehicle via processing of captured image data, the vehicular vision system determines a path of travel of the detected rearward-approaching vehicle;
wherein, as the equipped vehicle is driven along the traffic lane of the road, and responsive to determining that the path of travel of the detected rearward-approaching vehicle is along a side traffic lane adjacent to the traffic lane along which the equipped vehicle is driven, the vehicular vision system (i) displays at the video display screen video images derived at least from image data captured by the side camera that is at the side portion of the equipped vehicle that is adjacent to the side traffic lane and (ii) overlays a graphic overlay overlaying the displayed video images that is based on the determined path of travel of the detected rearward-approaching vehicle; and
wherein the graphic overlay comprises a partially transparent graphic overlay.

28. The vehicular vision system of claim 27, wherein the field of view of the left-side camera partially overlaps the field of view of the rear camera, and wherein the field of view of the right-side camera partially overlaps the field of view of the rear camera.

29. The vehicular vision system of claim 27, wherein the graphic overlay overlaying the displayed video images is indicative of the determined path of travel of the detected rearward-approaching vehicle.

30. The vehicular vision system of claim 27, wherein the partially transparent graphic overlay overlays a portion of the displayed video images, and wherein the video images displayed at that portion are at least partially viewable by the driver of the equipped vehicle through the partially transparent graphic overlay.

31. The vehicular vision system of claim 27, wherein the non-imaging sensor comprises a radar sensor.

32. The vehicular vision system of claim 27, wherein the non-imaging sensor comprises a lidar sensor.

33. The vehicular vision system of claim 27, wherein the non-imaging sensor comprises a left-side non-imaging sensor accommodated in the left-side exterior rearview mirror at the left side portion of the equipped vehicle and a right-side non-imaging sensor accommodated in the right-side exterior rearview mirror at the right side portion of the equipped vehicle.

34. The vehicular vision system of claim 27, wherein the graphic overlay comprises a plurality of rectangular overlays overlaying where the side traffic lane is displayed in the displayed video images.

35. The vehicular vision system of claim 27, wherein, as the equipped vehicle is driven along the traffic lane of the road, and responsive to determining that the path of travel of the detected rearward-approaching vehicle is along a left-side side traffic lane adjacent to the traffic lane along which the equipped vehicle is driven, the vehicular vision system displays at the video display screen video images derived at least from image data captured by the left-side camera.

36. The vehicular vision system of claim 35, wherein, as the equipped vehicle is driven along the traffic lane of the road, and responsive to determining that the path of travel of the detected rearward-approaching vehicle is along a right-side side traffic lane adjacent to the traffic lane along which the equipped vehicle is driven, the vehicular vision system displays at the video display screen video images derived at least from image data captured by the right-side camera.

37. The vehicular vision system of claim 36, wherein the processor processes captured image data over multiple frames of captured image data to track the detected rearward-approaching vehicle as it approaches the equipped vehicle.

38. The vehicular vision system of claim 37, wherein the video display screen is disposed at an interior rearview mirror assembly of the equipped vehicle.

39. The vehicular vision system of claim 36, wherein the processor processes captured image data over multiple frames of captured image data to track the detected rearward-approaching vehicle as it overtakes the equipped vehicle.

\* \* \* \* \*

UNITED STATES PATENT AND TRADEMARK OFFICE
CERTIFICATE OF CORRECTION

PATENT NO. : 11,572,015 B2
APPLICATION NO. : 17/457701
DATED : February 7, 2023
INVENTOR(S) : Ghanshyam Rathi et al.

Page 1 of 1

It is certified that error appears in the above-identified patent and that said Letters Patent is hereby corrected as shown below:

In the Specification

Column 8
Line 4, "angle iv" should be --angle ψ--
Line 11, "angle iv" should be --angle ψ--

Signed and Sealed this
Third Day of September, 2024

Katherine Kelly Vidal
*Director of the United States Patent and Trademark Office*